United States Patent [19]
Brockmann et al.

[11] Patent Number: 5,249,297
[45] Date of Patent: Sep. 28, 1993

[54] METHODS AND APPARATUS FOR CARRYING OUT TRANSACTIONS IN A COMPUTER SYSTEM

[75] Inventors: Russell C. Brockmann; Leith Johnson; William S. Jaffe, all of Fort Collins, Colo.

[73] Assignee: Hewlett-Packard Company, Palo Alto, Calif.

[21] Appl. No.: 694,265

[22] Filed: Apr. 29, 1991

[51] Int. Cl.⁵ .............. G06F 13/00; G06F 13/18; G06F 15/16
[52] U.S. Cl. .................. 395/725; 395/325; 364/228.3; 364/260; 364/256.3; 364/242.6; 364/242.92; 364/DIG. 1
[58] Field of Search ............ 395/725, 325, 425, 275, 395/650, 375; 365/230.01; 340/825.51, 825.52; 370/85.2, 85.6

[56] References Cited

U.S. PATENT DOCUMENTS

| | | | |
|---|---|---|---|
| 3,886,524 | 5/1975 | Appelt | 364/200 |
| 4,229,788 | 10/1980 | Consigli et al. | 364/200 |
| 4,320,457 | 3/1982 | Tanikawa | 364/200 |
| 4,449,183 | 5/1984 | Flahive et al. | 364/200 |
| 4,661,905 | 4/1987 | Bomba et al. | 364/200 |
| 4,896,257 | 1/1990 | Ikeda et al. | 364/200 |
| 4,977,494 | 12/1990 | Gabaldon et al. | 364/167.01 |
| 4,993,023 | 2/1991 | Phinney | 370/85.13 |
| 5,012,409 | 4/1991 | Fletcher | 364/200 |
| 5,072,363 | 12/1991 | Gallagher | 395/725 |
| 5,121,488 | 6/1992 | Ngai | 395/375 |
| 5,129,090 | 7/1992 | Bland et al. | 395/725 |

FOREIGN PATENT DOCUMENTS

WO90/00282 1/1990 PCT Int'l Appl.

OTHER PUBLICATIONS

Alpert J. Levy, "Architecture of the NS32532 Microprocessor," IEEE, 1987, pp. 168–172.
Woodbury, P. et al., "Shared Memory Multiprocessors: The Right Approach to Parallel Processing," IEEE, 1989, pp. 72–80.
IBM Technical Disclosure Bulletin, vol. 34, No. 1, Jun. 1991, pp. 254–256.

Primary Examiner—Michael R. Fleming
Assistant Examiner—Gopal C. Ray

[57] ABSTRACT

A protocol for carrying out transactions in a multiple-processor computer system comprises: dividing the transaction cycle into four quadrature states, an arbitrate state, an I/O state, a slave address state and a virtual memory state. The protocol enables the processors to determine before arbitrating whether the memory device is busy, which reduces the number of "busied" transactions.

20 Claims, 9 Drawing Sheets

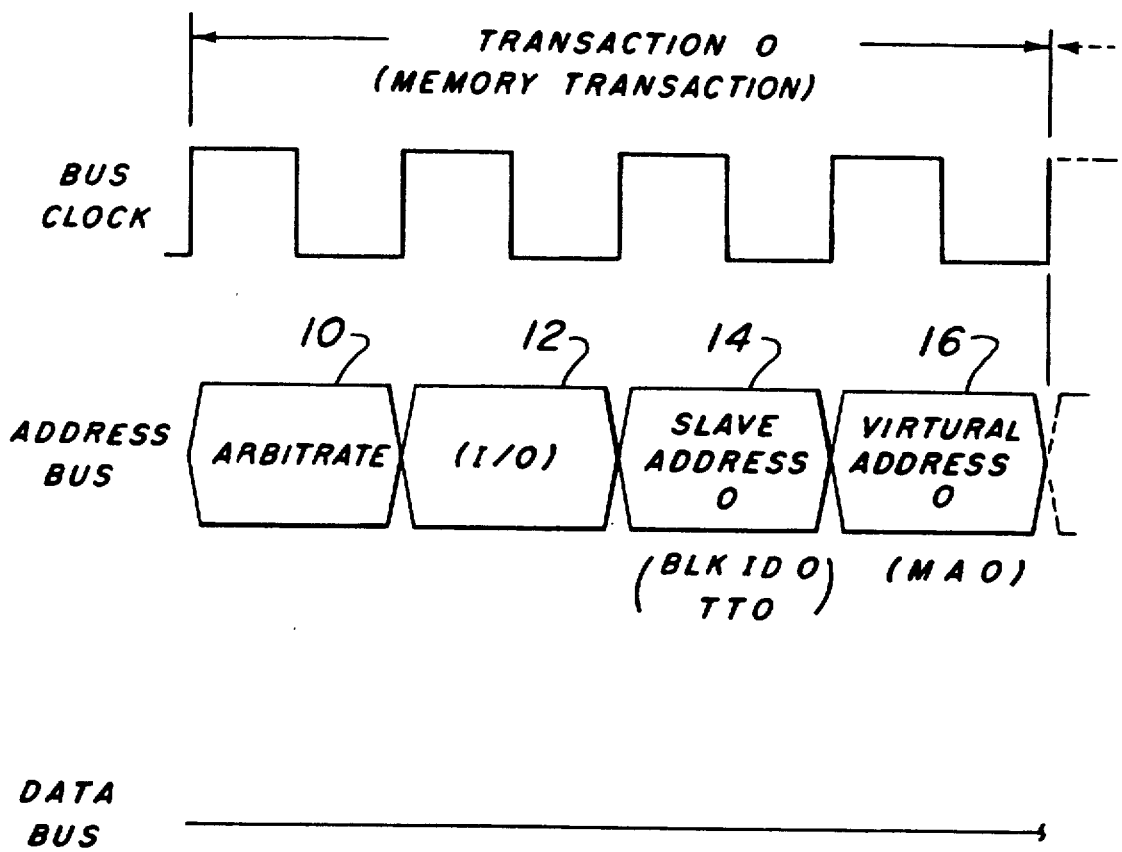

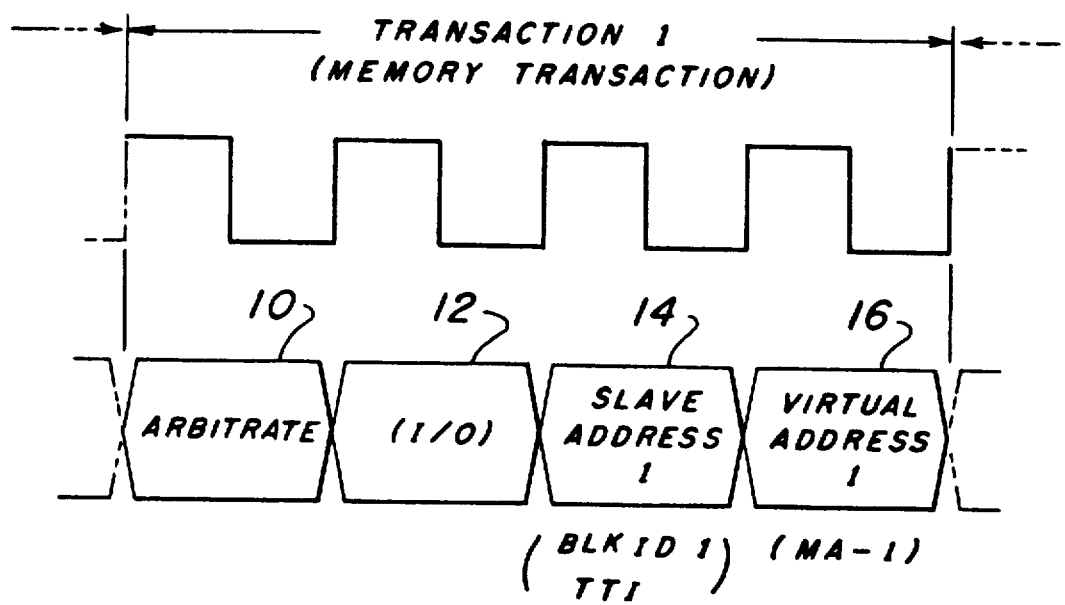

FIG. 6C
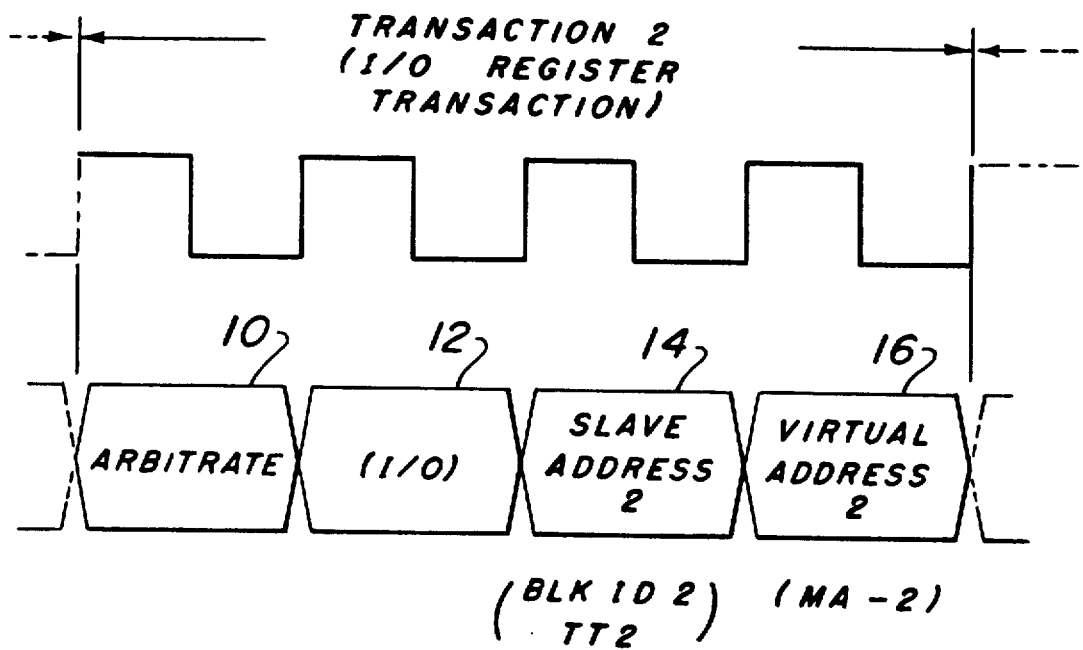
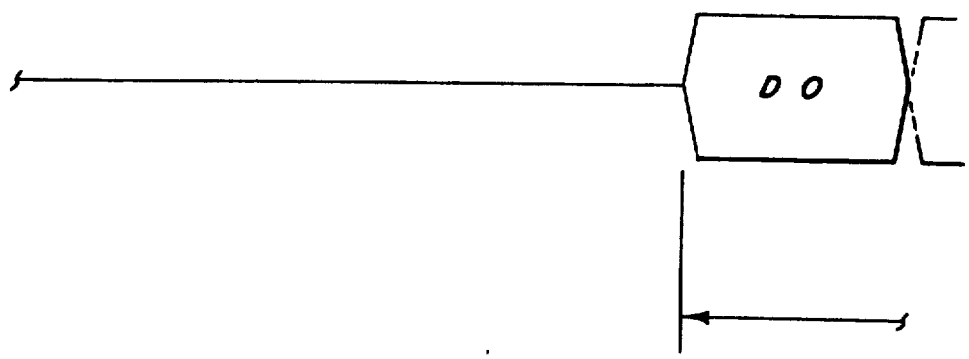

METHODS AND APPARATUS FOR CARRYING OUT TRANSACTIONS IN A COMPUTER SYSTEM

FIELD OF THE INVENTION

The present invention relates generally to pipelined-bus protocols for carrying out transactions in a computer system. More particularly, the invention relates to a method and corresponding apparatus for carrying out transactions in a multi-processor computer system by dividing the transactions into "quadrature state" processes.

BACKGROUND OF THE INVENTION

Many computer systems include a plurality of processing units, e.g., master processors, that simultaneously interact with shared resources, such as I/0 devices, slave processors and memory devices. The master processors of these systems are typically coupled to the various resources via a single address bus and a single data bus. Signals to/from the respective master processors must be sent from/to the respective resource devices over one of these buses.

There are three important parameters that must be considered when defining a bus: bandwidth, latency and cost.

Bandwidth is a measure of the quantity of data that can be transferred over the bus per second. Bandwidth is important because the data bus connecting the memory devices to the master processors can create a "bottleneck" through which all memory transactions must pass; thus, a large-bandwidth data bus is important to the overall speed of the computer system.

Latency represents the time it takes to transfer data between memory and a processor. A great deal of complexity can be added to a system to improve bandwidth and latency; however, this added complexity increases the cost of the system. A goal of the bus designer is to maximize bandwidth and minimize latency for the least possible cost. To achieve this goal, a protocol is required for accessing the address bus when more than one of the master processors "desires" to conduct a transaction with one of the resources, e.g., a read or write to or from memory. In theory an infinite variety of such protocols is possible, however it is desirable that the protocol facilitate a simplified bus design by standardizing all transactions. It is further desirable that the protocol not require the memory devices to be complex, or "smart." The present invention achieves these goals.

SUMMARY OF THE INVENTION

The invention provides a method for carrying out transactions between a processor and a slave or memory device, such as, e.g., a slave processor. According to the invention, such a method comprises the steps of first identifying one of the processors as having priority over the other processors to access of the bus. This step is performed during a first state of the computer system. Next, during a second state of the computer system, data is transferred between one of the slave devices and the identified one of the processors. Next, during a third state of the computer system, a slave device address is transferred from the processor having priority (i.e., priority to access of the bus) to the bus. Finally, during a fourth state, a virtual address is transferred from the processor having won priority to the slave device via the bus.

The invention also provides a computer system comprising a plurality of master processors, at least one slave or memory device, a bus coupling the master processors to the slave or memory device, and means for implementing a protocol for carrying out a transaction between one of the master processors and the slave or memory device. The means for carrying out the protocol comprises means for carrying out the above method steps.

An alternative computer system in accordance with the invention includes a plurality of processors and memory devices interconnected via a bus, with all transactions between the processors and memory devices carried out in accordance with the following protocol: First, a plurality of periodic states during which the transactions are to be conducted is defined. The states should each have a fixed duration in time and recur between fixed intervals. Next, each transaction is divided into a prescribed number of processes, each process to be carried out during a predefined one of the periodic states. This protocol makes the processors capable of determining whether a given memory device is busy before attempting to carry out a transaction with the given device.

BRIEF DESCRIPTION OF THE DRAWINGS

FIGS. 6A-6F together make up a timing diagram for a computer system accord with the present invention.

DETAILED DESCRIPTION THE PREFERRED EMBODIMENT

The present invention is an attempt to maximize bandwidth and minimize latency in a computer system while keeping complexity and cost at a reasonable level. It accomplishes this by combining pipelining with a novel address bus protocol.

To achieve pipelining, all memory transactions are sent out over an address bus and data is returned over a separate data bus. Multiple addresses can be sent out before any data is returned. The time slot during which data is returned is fixed by the system and based upon the response time of the memory. This simplifies memory design and lowers cost while also allowing the memory design to be optimized for minimum latency.

The address bus is split into groups of 4 states, known as "quads." Control of the bus is simplified by defining all transactions to consist of these 4 states. The 4 states are the "arbitrate state", "I/O state", "slave address state", and "virtual address state." Because the bus is pipelined and all transactions take the same amount of time, the invention allows a processor to determine beforehand whether the memory block it needs to access is busy with a request from another processor; thus it can inhibit its arbitration until it determines the memory block is free. This reduces the number of transactions on the bus that must be "busied" (retried) by the processor, which improves bandwidth.

The preferred embodiments of the invention will now be described with reference to the drawings, wherein like characters refer to like elements or steps.

Figure 1:
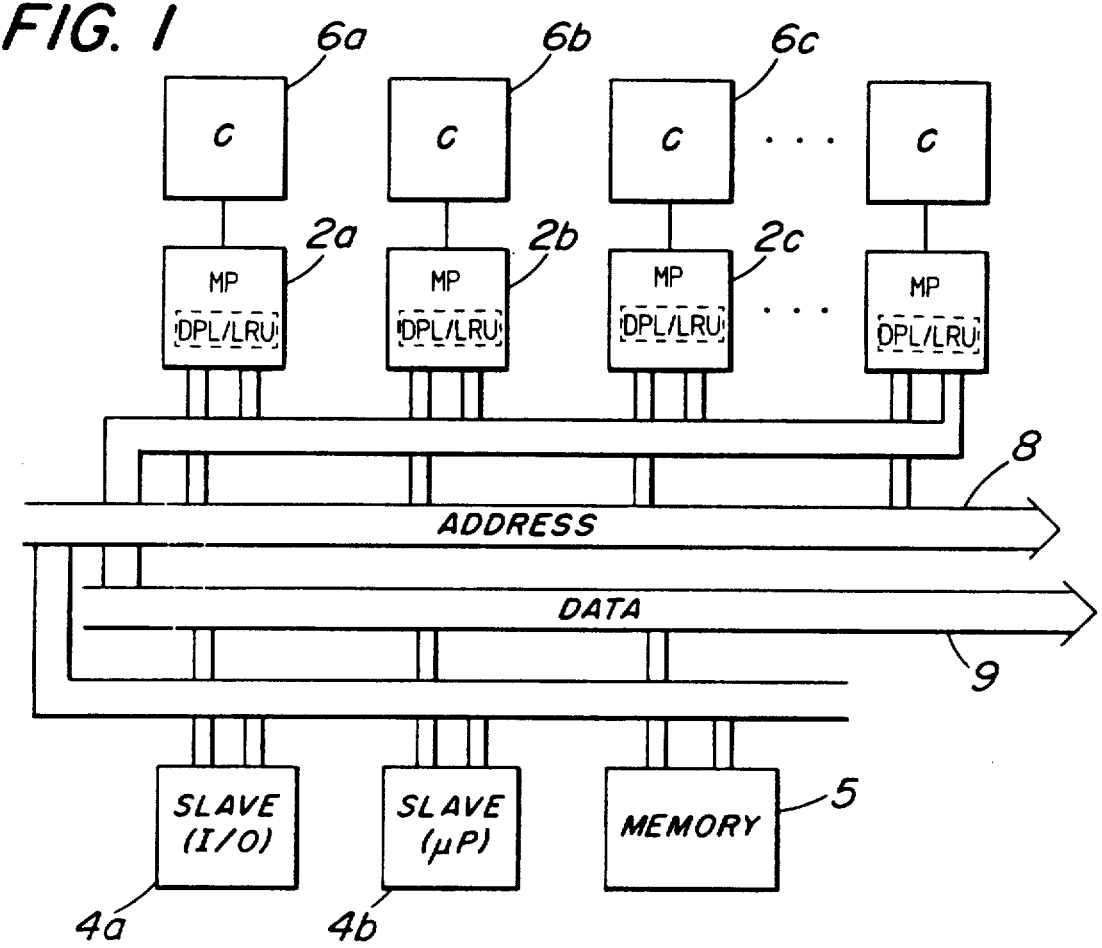
FIG. 1 is a block diagram of a pipelined multi-processor computer system in accordance with the present invention.
Figure 2:
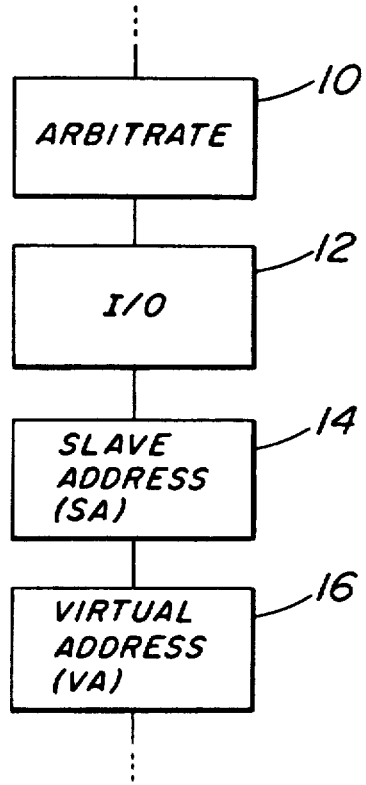
FIG. 2 is a flowchart of a method of carrying out transactions in a pipelined multi-processor computer system in accordance with the present invention.

FIG. 1 depicts a pipelined computer system in accordance with the present invention. As shown, the system of FIG. 1 comprises a plurality of master processors ("MPs") 2a, 2b, 2c, etc., each of which is coupled to an associated unit of high speed cache memory 6a, 6b, 6c, etc. The master processors 2a, 2b, 2c, etc., are also coupled via an address bus to one or more slave processors 4a, 4b (e.g., a slave I/O unit and a slave processor) and a unit of main memory 5. The high speed cache units 6a, 6b, 6c, etc., are loaded with data or instructions, at medium speed, from main memory 5 via data bus 9 All transactions between master processors 2a, 2b, 2c, etc., and slave processors 4a, 4b or main memory 5 are divided into an address quad and an associated data quad. The data quad is performed during a fixed interval of time following its associated address quad. The standardization of all transactions simplifies the design of interfaces between the various components of the system. The standardization also simplifies memory design, since memory simply starts its address bus accesses during an address quad and dumps data during a corresponding data quad.

Referring now to FIGS. 2 and 6A-6F, an address quad in accordance with the invention comprises four states of fixed duration during which various processes are carried out, the processes directed toward executing a transaction between a master processor and slave I/O device 4a, slave processor 4b or memory device 5. The address quad comprises an arbitrate state 10, an I/O state 12, a slave address (SA) state 14 and a virtual address (VA) state 16. During the arbitrate state 10, the various master processors 2a, 2b, 2c, etc., contend for access to the address bus 8. This procedure is described more fully below with reference to FIG. 3.

During the I/O state 12, data is transferred, via address bus 8, between the master processor that won priority over the bus during a preceding arbitration and an I/O device 4a or slave processor 4b. Note that the data transferred during any I/O state 12 is data that was requested during a previous quad. In addition, it should be noted that transactions between a master processor and memory device 5 utilize the data bus 9. The foregoing can be seen from the timing diagram depicted in FIGS. 6A-6F, wherein "MA" denotes master address, "TT" denotes transaction type and "ST" denotes status information from a slave device.

Next, during the slave address state 14, the address of the slave device 4a, 4b to be transacted with by the winning master processor 2a, 2b, 2c, etc. is transmitted onto address bus 8, from which it can be received by the respective slave devices. As shown in FIGS. 4 and 6A-6F, during the slave address state 14 three parallel operations 14a, 14b, 14c take place: the slave address is sent onto the address bus, block 14a, a transaction type (TT) identifier is sent onto the address bus, block 14b, and a block ID (BLK ID) number is sent onto the address bus, block 14c. These operations are preferably performed simultaneously. Note that the block ID number is employed for interleaving blocks of memory.

Finally, during the virtual address state 16 a virtual address is transmitted from the master processor having won priority over the address bus (during the arbitrate state 10) to the address bus. The virtual address state 16 is used for cache coherency checking, i.e., checking to ensure that all of the cache memory units 6a, 6b, 6c, etc., contain identical data for the same address. In addition, during the virtual address state 16, the master processor address (MA) (i.e., the address of the master processor with priority over the address bus) is transmitted onto the bus. These steps are performed in parallel, as shown in FIGS. 5 and 6A-6F.

Figure 3:
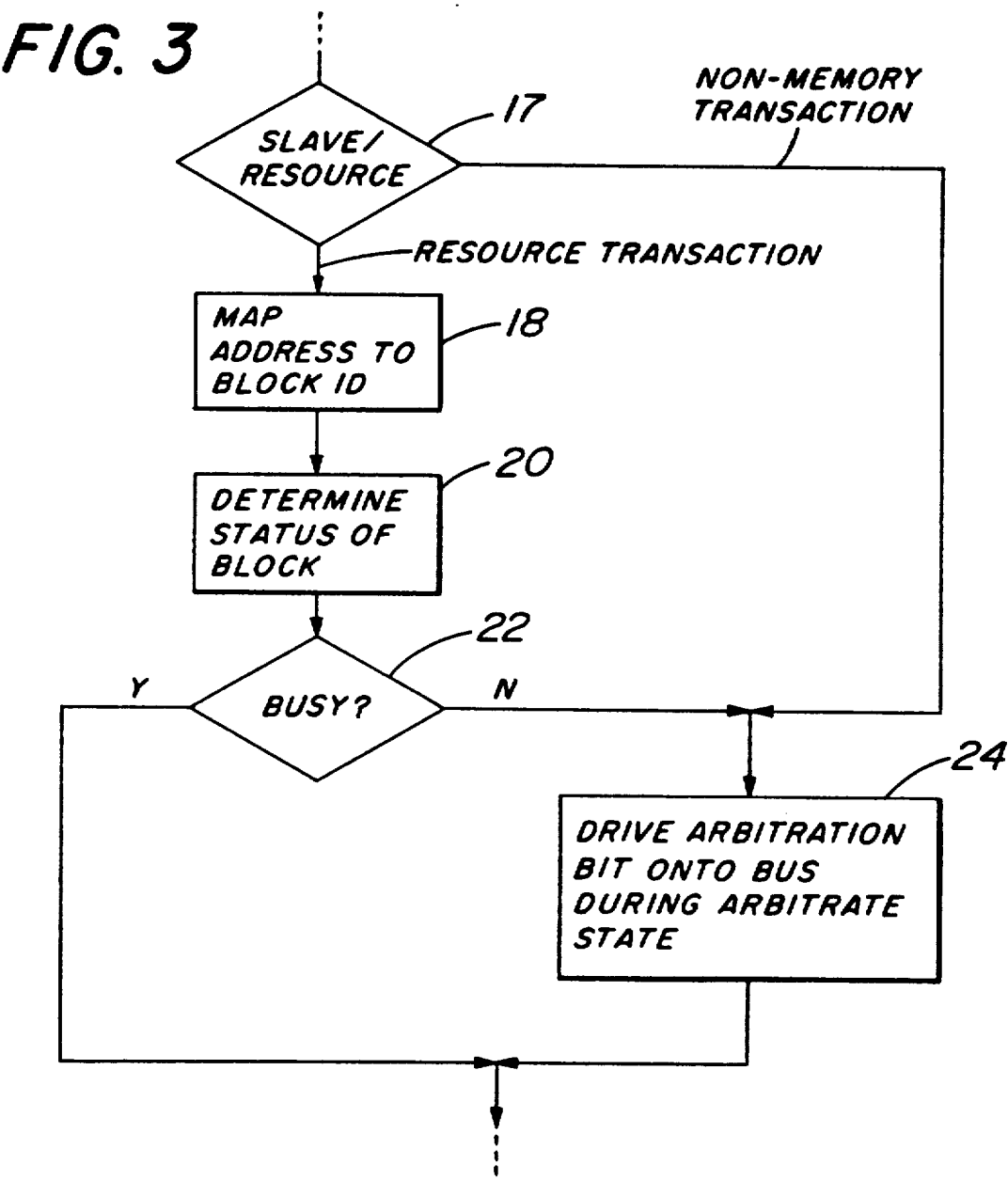
FIG. 3 is a flowchart of a method of arbitrating access to a bus, corresponding to block 10 of FIG. 2.
Figure 4:
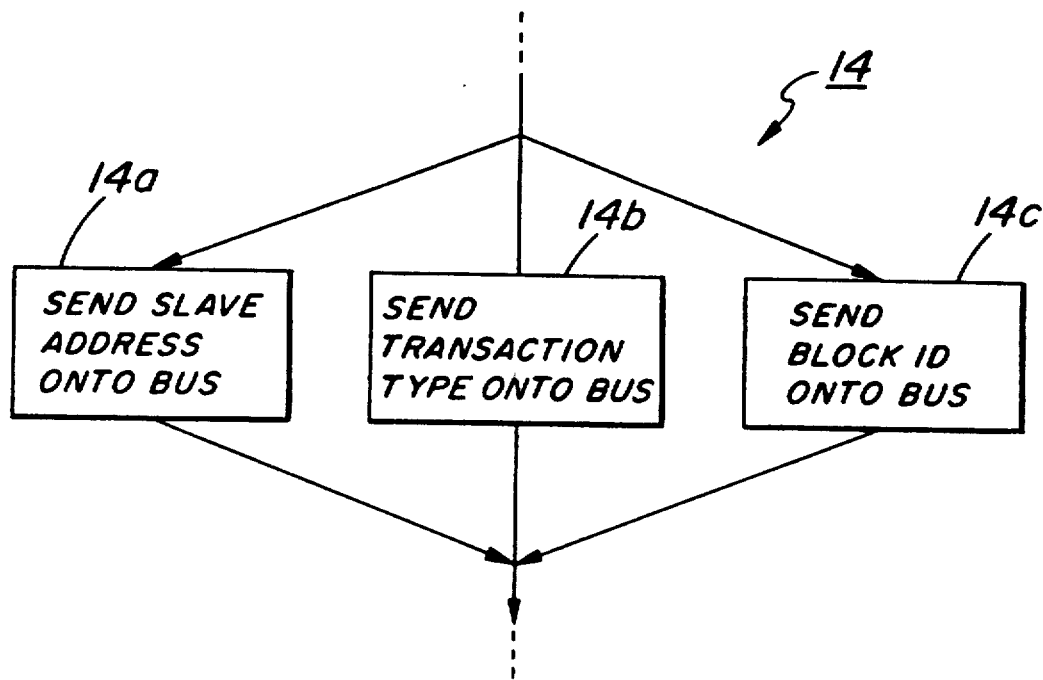
FIG. 4 is an expanded view of the slave address block 14 of FIG. 2.
Figure 5:
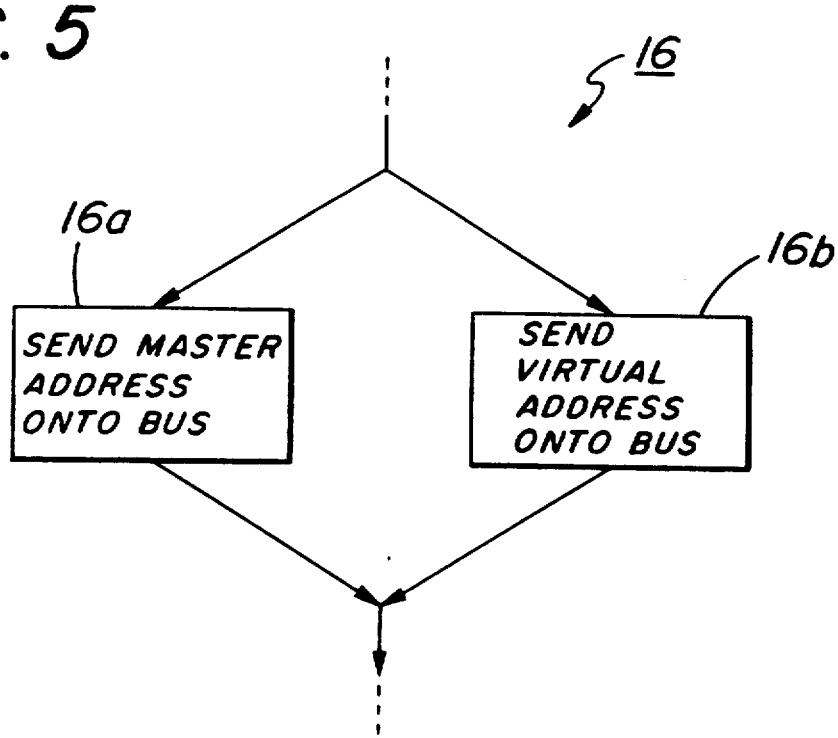
FIG. 5 is an expanded view of the virtual address block 16 of FIG. 2.
Figure 6D:
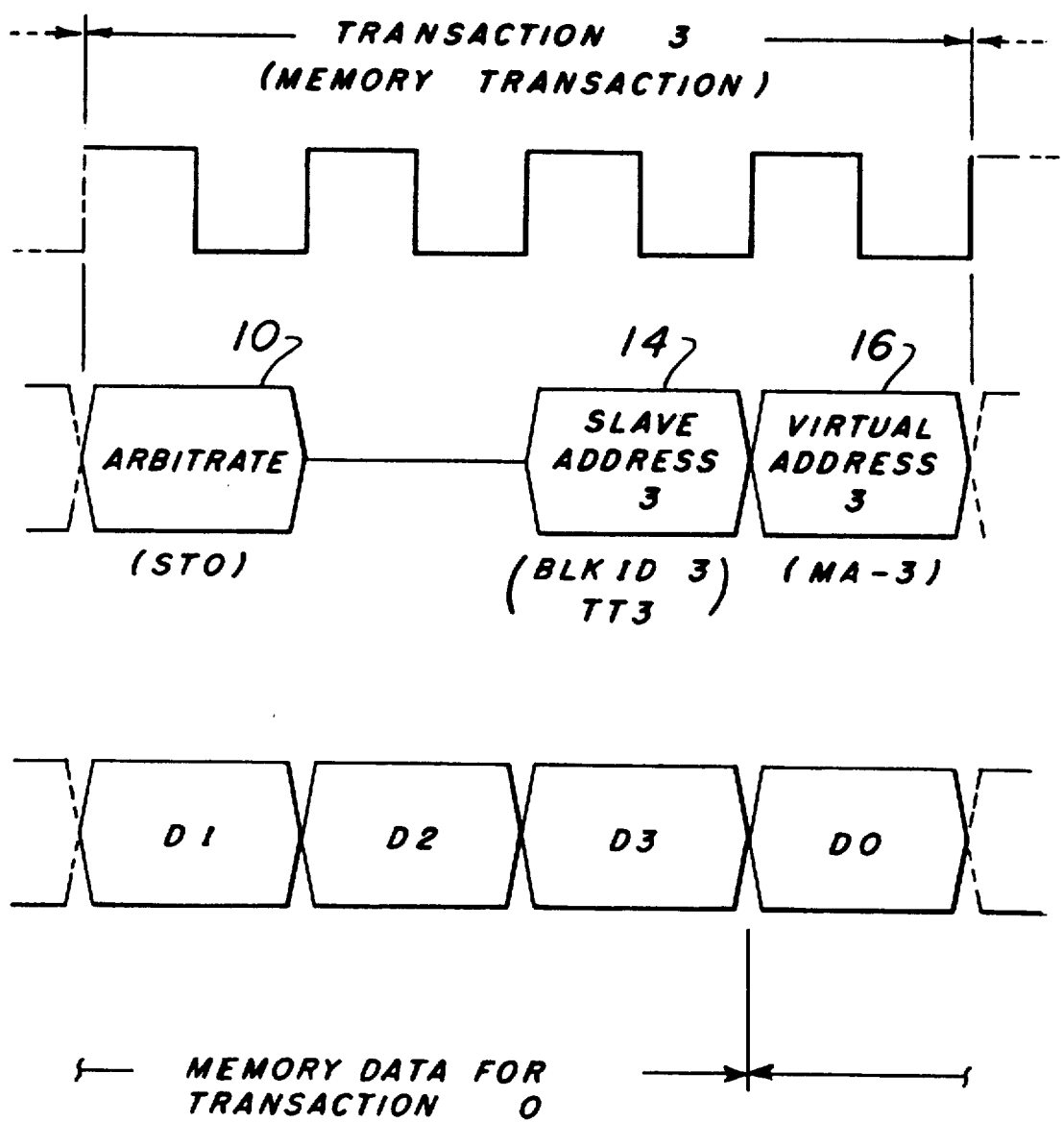
Figure 6E:
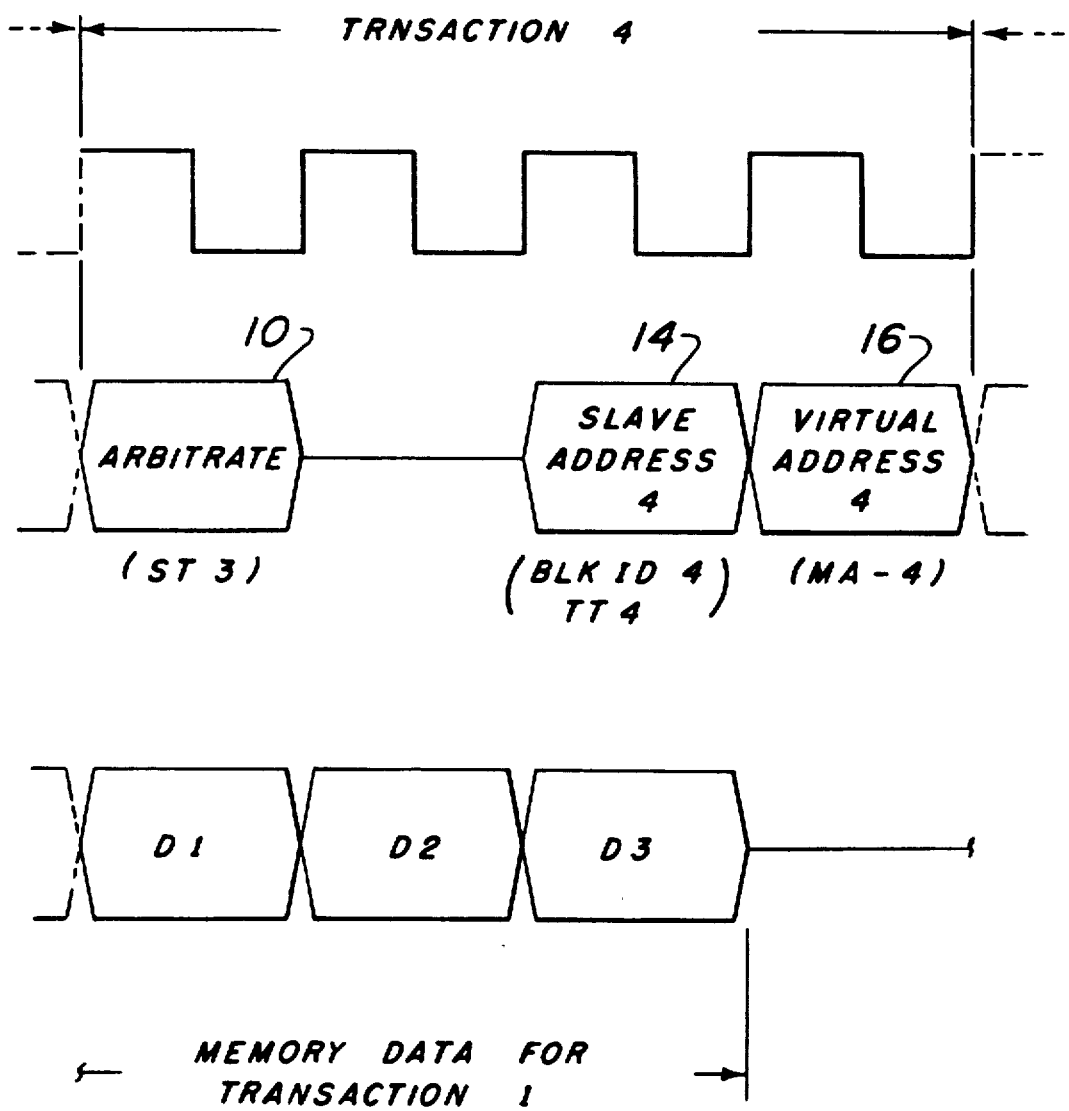
Figure 6F:
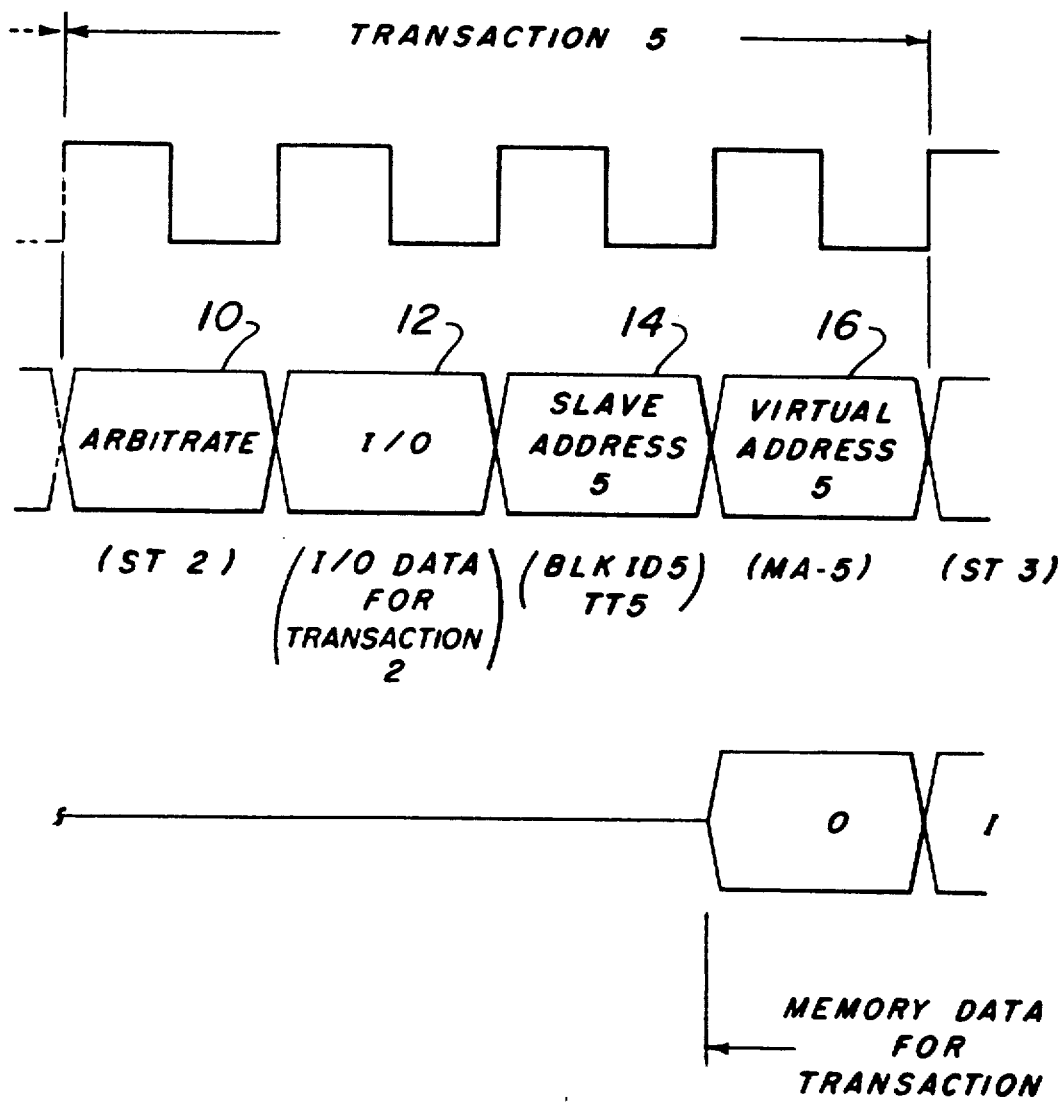

Referring now to FIG. 3, a preferred method of arbitrating access to the bus during the arbitrate state 10 will now be described in greater detail. First, a determination is made by a master processor whether the intended transaction is to be with a non-memory I/O device (slave) or a memory resource, step 17. If the intended transaction is with a non-memory device 4a, 4b, step 24 is executed next; otherwise, if the intended transaction is with a memory device, the memory address is mapped to a block ID number, step 18.

At steps 20 and 22 the master processor determines the status of the intended device. If a non-memory device is busy, it sends a busy status signal (ST (see FIGS. 6D-6F)) to the master processor. Thus, if the device to be accessed is an I/O device 4a or slave processor 4b, no mapping or status check is required; the master processor is free to arbitrate provided the I/O device is not busy. The master checks the status of a memory device by maintaining a list of memory block ID numbers sent onto the bus during the previous N states. Typically, N corresponds to the number of states within the previous 120 ns. If the memory device hasn't been accessed during the previous N states it is assumed to be not busy, and the master processor is free to arbitrate. If the intended device is found to be busy, nothing further is done during the arbitrate state. If the intended device is not busy, a determination is made of which master processor is to be given priority to the bus, step 24. The determination of priority may be made on any one of a number of known arbitration algorithms, e.g., an LRU (least recently used) or DPL (distributed priority list) algorithm.

The relationship between the address quads 10, 12, 14, 16 and data quads D0, D1, D2, D3 is shown in FIGS. 6A-6F. Five address quads are shown. The first two are memory transactions in which data is returned on the data bus some fixed time after the corresponding address quad. Typical times are 120 ns after the corresponding slave address state.

Note that memory accesses are usually in lines, but may also be in double lines, half lines, bytes, etc. (A line is simply a standard number of bytes associated with a particular cache "tag".) For example, if the processor attempts to read a memory location in cache, and misses, it will issue a memory transaction over the bus. A line (e.g., 32 bytes) will be loaded into cache and associated with a particular cache tag. If the transaction is with an I/O register, the data is returned via address bus 8 during the I/O state of the address quad. This is done to allow inexpensive I/O device implementations that don't have to be connected to data bus 9.

It should be noted that the present invention is not intended to be limited to the specific architecture or methods described above. For example, the invention may be employed in computer systems other than ones conforming exactly to the block diagram in FIG. 1. In addition, the invention is not intended to be limited to any specific set of arbitration rules. Other variations and modifications of the preferred embodiments will be apparent to those skilled in the art as well.

What is claimed is:

1. In a computer system having a plurality of processors, a memory, and a connected device, a method of carrying out a transaction between one of the processors and the connected device, the processors and connected device being interconnected via a bus, the method comprising the steps of:
    (a) defining first, second, third and fourth sequential, periodic states during which processes associated with said transaction are to be carried out;
    (b) identifying one of said processors as having priority over the others of said processors to access of said bus, said identifying step being performed during said first state of said computer system;
    (c) transferring, during said second state of said computer system, data between said connected device and the identified one of said processors;
    (d) transferring, during said third state of said computer system, a connected device address from the identified processor to said bus; and
    (e) transferring, during said fourth state of said computer system, a virtual address from the identified processor to said bus, said virtual address being an address of a memory location containing data or an instruction associated with the transaction to be carried out.

2. The method recited in claim 1, wherein each of said first, second third and fourth states occur for first, second, third and fourth predefined durations, respectively.

3. The method recited in claim 2, wherein said first, second, third and fourth durations are substantially equal.

4. The method recited in claim 2, wherein said first, second, third and fourth durations are substantially non-overlapping.

5. The method recited in claim 2, wherein said first, second, third and fourth durations are substantially equal and substantially non-overlapping.

6. The method recited in claim 1, further comprising the step of:
    determining, during said first state, whether said connected device is busy and, if so, denying priority to any of the processors attempting to carry out a transaction with the busy connected device.

7. The method recited in claim 6, further comprising the step of:
    transferring, during said first state, a signal indicative of the identity of the identified processor from the identified processor to the other processors, said signal being usable in assessing which processor is to be given priority to the bus in a future transaction, especially when at least recently used or distributed priority list algorithm is employed.

8. The method recited n claim 1, further comprising the step of:
    transferring from the identified processor to the bus, during said third state, a signal indicative of the type of transaction to be carried out.

9. The method recited in claim 1, wherein the connected device is a memory device, and further comprising the step of:
    transferring from the identified processor to the bus, during the fourth state, a virtual address corresponding to the memory device.

10. The method recited in claim 9, further comprising the steps of:
    determining during said first state whether said memory device is busy and, if so, denying priority to any of the processors attempting to carry out a transaction with the busy memory device;
    transferring during said first state a signal indicative of the identity of the identified processor from the identified processor to the other processors; and
    transferring a signal indicative of the type of transaction to be carried out, during said third state, from the identified processor the bus.

11. (Twice Amended) A computer system, comprising:
    (a) a plurality of master processors;
    (b) at least one connected device and a memory;
    (c) a bus coupling said master processors to said connected device and memory; and
    (d) means for implementing a protocol for carrying out a transaction between one of said master processors and said connected device, comprising:
        (i) means for defining first, second, third and fourth sequential, periodic states during which processes associated with said transaction are to be carried out;
        (ii) means or identifying one of said processors as having priority over the other processors to access of said bus, said identifying step being performed during a first state of said computer system;
        (iii) means for transferring data between said connected device and the identified one of said processors during a second state of said computer system;
        (iv) means for transferring, during a third state of said computer system, a connected device address from the identified processor to said bus; and
        (v) means for transferring, during a fourth state of said computer system, a virtual address form the identified processor to said bus, said virtual address being an address of a memory location containing data or an instruction associated with the transaction to be carried out.

12. The apparatus recited in claim 11, wherein each of said first, second, third and fourth states occur for first, second, third nd fourth predefined durations, respectively.

13. The apparatus recited in claim 12, wherein said first, second, third and fourth durations are substantially equal.

14. The apparatus recited in claim 12, wherein said first, second, third and fourth durations are substantially non-overlapping.

15. The apparatus recited in claim 12, wherein said first, second, third and fourth durations are substantially equal and substantially non-overlapping.

16. The apparatus recited in claim 15, further comprising:
    means for determining whether said connected device is busy and, if so, denying priority to any of the processors attempting to carry out a transaction with the busy connected device;
    means for transferring a priority signal from the identified processor to th other processors, said priority signal indicative of the identity of the identified processor;

means or transferring a type signal from the processor to the bus, said type signal indicative of the type of transaction to be carried out; and means for transferring a virtual address from the identified processor to the bus.

17. The apparatus recited in claim 12, further comprising:

means for determining whether said connected device is busy and, if so, denying priority to any of the processors attempting to carry out a transaction with the busy connected device.

18. The apparatus recited in claim 16, further comprising:

means for transferring a priority signal from the identified processor to the other processors, said priority signal indicative of the one of said processors determined as having priority.

19. The apparatus recited in claim 11, further comprising:

means for transferring a type signal from the identified processor to the bus, said type signal indicative of the type of transaction to be carried out.

20. The apparatus recited in claim 11, wherein the connected device is a memory device and further comprising means for transferring from the identified processor to the bus a virtual address corresponding to the memry device.

* * * * *